United States Patent
Dux et al.

(10) Patent No.: US 9,667,776 B1
(45) Date of Patent: May 30, 2017

(54) BI-DIRECTIONAL AUDIO GENERATION DEVICE FOR SPEECH QUALITY ASSESSMENT OF TELEPHONY NETWORKS AND SPEECH CODECS

(71) Applicant: Cyara Solutions Pty Ltd, Hawthorn, VIC (AU)

(72) Inventors: Tony Dux, Chermside (AU); Geoff Willshire, Yeronga (AU)

(73) Assignee: Cyara Solutions Pty Ltd, Hawthorn (AU)

( * ) Notice: Subject to any disclaimer, the term of this patent is extended or adjusted under 35 U.S.C. 154(b) by 0 days.

(21) Appl. No.: 15/371,191

(22) Filed: Dec. 6, 2016

(51) Int. Cl.
*H04M 1/24* (2006.01)
*H04M 3/08* (2006.01)
*H04M 3/22* (2006.01)
*H04M 3/32* (2006.01)
*H04M 3/42* (2006.01)

(52) U.S. Cl.
CPC ......... *H04M 3/323* (2013.01); *H04M 3/2236* (2013.01); *H04M 3/42221* (2013.01)

(58) Field of Classification Search
CPC ........ H04M 1/24; H04M 3/2236; H04M 3/28; H04M 3/2227; H04M 3/323; H04M 3/51; H04M 3/5183; H04L 43/04; H04L 43/0829; H04L 43/087; H04L 47/196; H04L 41/145; H04L 12/2697; H04L 43/0823; H04L 43/50; H04W 24/06; G10L 25/60
USPC .... 379/1.01, 1.02, 9, 9.04, 14, 10.01, 10.02, 379/10.03, 15.01, 22.01, 22.02, 24, 27.01, 379/27.04, 29.01, 29.02, 29.1
See application file for complete search history.

(56) References Cited

U.S. PATENT DOCUMENTS

| | | | | |
|---|---|---|---|---|
| 5,359,646 A | * | 10/1994 | Johnson | H04M 3/2254 379/27.02 |
| 5,384,822 A | * | 1/1995 | Brown | H04M 3/323 379/10.01 |
| 5,933,475 A | * | 8/1999 | Coleman | H04B 17/0085 379/1.02 |
| 5,940,472 A | * | 8/1999 | Newman | H04M 3/2254 379/10.02 |
| 8,737,571 B1 | | 5/2014 | Seeley et al. | |
| 9,386,145 B2 | | 7/2016 | Assem et al. | |
| 2008/0146216 A1 | * | 6/2008 | Newman | H04L 12/2697 455/424 |
| 2012/0140902 A1 | * | 6/2012 | Tai | H04M 3/2218 379/32.01 |
| 2013/0286860 A1 | * | 10/2013 | Dorenbosch | H04W 24/06 370/252 |
| 2015/0244857 A1 | * | 8/2015 | Kulkarni | H04M 3/2236 379/32.01 |

* cited by examiner

*Primary Examiner* — Binh Tieu
(74) *Attorney, Agent, or Firm* — Galvin Patent Law LLC; Brian R. Galvin

(57) ABSTRACT

A system for bi-directional quality testing of a telephony system or network using an audio generation device configured to automate Perceptual Evaluation of Speech Quality assessments and connect to a communication endpoint through computer telephony integration (CTI) instruction or system configuration to enable auto-answering of the communication endpoint, listen, record, and process signals and audio data, calculate Mean Opinion Scores (MOS), generate signals and audio for playback, compare files using a full reference algorithm, and store data with MOS results displayed in data naming structure.

3 Claims, 10 Drawing Sheets

US 9,667,776 B1

BI-DIRECTIONAL AUDIO GENERATION DEVICE FOR SPEECH QUALITY ASSESSMENT OF TELEPHONY NETWORKS AND SPEECH CODECS

CROSS-REFERENCE TO RELATED APPLICATIONS

None.

BACKGROUND OF THE INVENTION

Field of the Art

The disclosure relates to the field of telephony, and more particularly to the field of quality of experience.

Discussion of the State of the Art

Audio system measurements are instrumental to operating and maintaining a reliable telephony network. Measurements may help in sizing and specifying new equipment or monitoring or troubleshooting existing equipment. Audio system measurements typically model psychoacoustic principles to assess the quality of a communication system as it may pertain to human hearing. In telephony systems, a Mean Opinion Score (MOS) provides a numerical indication of quality of speech as perceived by the listening end of the communication, and while it is subjective, MOS tests have been standardized and are specified by the International Telecommunications Union, ITU-T, under published recommendation P.800.

A Mean Opinion Score (MOS) is a type of quality measurement test that has been used for decades in telephony to obtain a human user's perceived quality of a voice call or audio file played over the given telephony network or system. Initially, a Mean Opinion Score is recorded by each listener as an integer in a range of 1 to 5, where 1 is the poorest perceived quality and 5 is the best perceived quality. A Mean Opinion Score is determined by computing the arithmetic mean of all scores recorded from the results of a set of standardized tests where a number of listeners score the perceived audible quality of a series of prescribed test sentences read aloud by both male and female voices within a prescribed test environment, over the communications medium being tested. A Mean Opinion Score is a subjective measurement process, as listeners need to sit together in a quiet room and score call quality as they perceive it. Obtaining a Mean Opinion Score is time-consuming and expensive, as it requires involving multiple prospective or active users to accomplish the protocols as required by the standardized testing methods.

In voice over internet protocol (VoIP) telephony, a Mean Opinion Score provides a numerical indication of perceived quality of a received media after compression/decompression (codec) and/or transmission has taken place. Measurement applications for wireless, VoIP, fixed and codec telephony systems have been developed and are calculated based on performance of the IP network used within the system, as well as empirically assimilated for automated MOS results via implementation of ITU-T P.862.1, mapping of Perceptual Evaluation of Speech Quality (PESQ) scores to Mean Opinion Score (MOS) scale.

Perceptual Evaluation of Speech Quality (PESQ) is presented in ITU-T recommendation P.862, and comprises a test methodology for assessment of speech quality as experienced by users of telephony systems or networks. Specifically, PESQ was developed to standardize and automate Mean Opinion Score tests by employing algorithms to analyze speech signals. PESQ utilizes true voice samples as test signals; use of other, non-spoken audible signals, such as tones or noise, may yield unpredictable results. PESQ is a full-reference (FR) algorithm and analyzes speech signal sample-by-sample after a sequential alignment of corresponding excerpts of reference and test signal. PESQ may be applied to provide end-to-end (E2E) quality assessment scores for a network or for individual network components.

A full reference (FR) algorithm, such as PESQ, uses an established reference signal for comparison purposes. It can compare each sample of the reference signal (upstream end) to each corresponding sample of the degraded signal (downstream end). Full reference measurements provide a high level of accuracy and repeatability, but they may only be applied for dedicated tests in live networks, therefore, technicians, or more generally, users, must be available on both ends to initiate, receive and complete the testing and quality assessment of the live network and/or its components.

What is needed in the art is an automated electronic device which may be connected to a telephony network component or a telephony system in order to accommodate and perform Perceptual Evaluation of Speech Quality assessments in an imitated live scenario such that an estimated Mean Opinion Score may be produced for a telephony system without need for live user involvement on either the dispatching (upstream) end or the receiving (downstream) end.

SUMMARY OF THE INVENTION

Accordingly, the inventor has conceived and reduced to practice, in a preferred embodiment of the invention, an automated electronic computing device which may be connected to a telephony network component such that an estimated Mean Opinion Score may be produced without need for live user involvement.

According to a preferred embodiment of the invention, a system for bi-directional quality testing of a telephony system or network using an audio generation device, comprising a computer comprising a processor, a memory, and a plurality of programming instructions stored in the memory and operable on the processor, wherein the plurality of programming instructions is configured to: connect to a communication endpoint (such as a PC sound device or a telephone turret) on one end of a call; listen through an analog interface of the communication endpoint for known commands originating from a prescribed call generation device; record signals and audio presented during the call; process signals and audio; calculate Mean Opinion Scores for downstream audio, and generate an upstream reference audio to facilitate the calculation of Mean Opinion Score at the call generation device; generate signals and audio for use during testing sequence; compare files for quality assessment; store files locally; and allow prescribed remote access via in-band audio signaling or via an adjunct network, is disclosed.

According to another preferred embodiment of the invention, a method for bi-directional quality testing of a telephony system or network operated by a call generation device by using an audio generation device connected to a communication endpoint, the method comprising the steps of: placing a call from the call generation device to the communication endpoint within the telephony system or network; answering the call generation device's call automatically at the dedicated communication endpoint; pausing and waiting by the call generation device, for a confirmed alive tone to be received by the audio generation device; sending an alive tone from the audio generation device, and the call generation device detecting and recording receipt of the alive tone; playing a specific tone from the call generation device to request the audio generation device to play a specific, prescribed reference audio file; preparing a local copy of the prescribed reference audio file using the audio generation device, then playing the reference audio file audibly as an utterance; capturing the utterance on the call generation device and storing the utterance as an audio file; processing, using the call generation device, the captured utterance with a Perceptual Evaluation of Speech Quality Full Reference algorithm to calculate a Mean Opinion Score; and recording and logging of the Mean Opinion Score by the call generation device, then continues processing further actions on the call until the endpoint disconnects the call, is disclosed.

According to another preferred embodiment of the invention, a method for bi-directional quality testing of a telephony system or network operated by a call generation device by using an audio generation device connected to a communication endpoint, the method comprising the steps of: placing a call from the call generation device to the communication endpoint within the telephony system or network; answering the call generation device's call automatically at the dedicated communication endpoint; pausing and waiting by the call generation device, for a confirmed alive tone to be received by the audio generation device; sending an alive tone from the audio generation device, and the call generation device confirming receipt of the alive tone; playing a specific tone from the call generation device, to direct the audio generation device to begin capturing an audible utterance; playing a prescribed reference audio file from the call generation device, to be captured as an utterance by the audio generation device; playing a specific tone from the call generation device, to direct the audio generation device to stop capturing the audible utterance and store it as an audio file; processing, using the audio generation device, the captured utterance with a Perceptual Evaluation of Speech Quality Full Reference algorithm to calculate a Mean Opinion Score; communicating the Mean Opinion Score result from the audio generation device back to the call generation device by way of audible speech; the call generation device recognizing the speech and logging the Mean Opinion Score; replaying the captured utterance file from the audio generation device back to the call generation device; and recording and logging of the utterance audio file by the call generation device, then continues processing further actions on the call until the endpoint disconnects the call, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
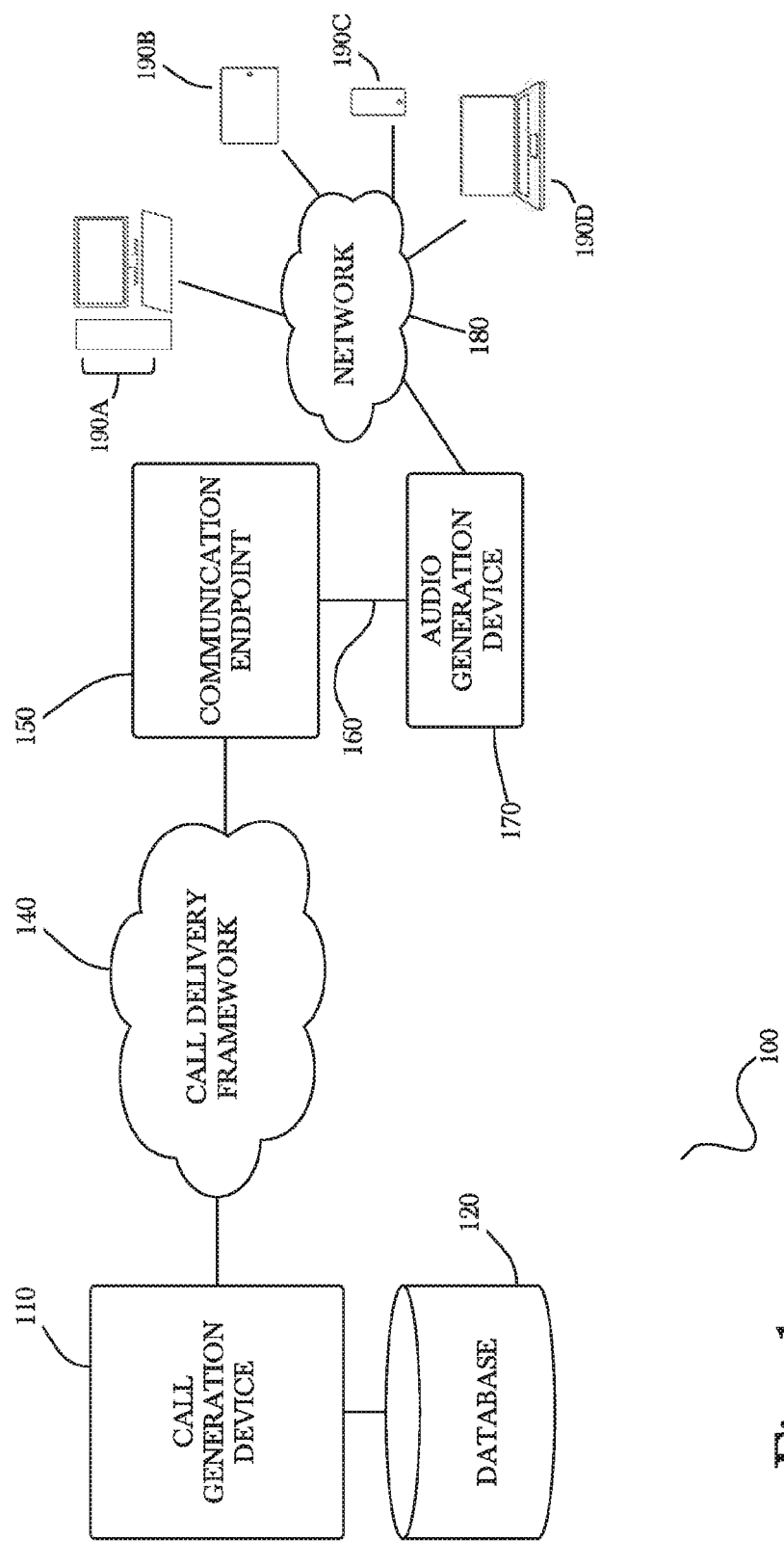
FIG. 1 is a block diagram illustrating an exemplary architecture for a telephony system that uses a call generation device, a call delivery framework, a communication endpoint for receiving a call, and an audio generation device connected to the communication endpoint to facilitate automated testing protocols and sequences, according to a preferred embodiment of the invention.

The inventor has conceived, and reduced to practice, in a preferred embodiment of the invention, an automated electronic computing device which may be connected to a telephony network component such that an estimated Mean Opinion Score may be produced without need for live user involvement.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary architecture for a telephony system 100 that uses a call generation device 110 with access to a database 120, a call delivery framework 140, a communication endpoint 150 for receiving a call, such as, for example, a computing sound device or a telephone turret, an audio generation device 170 connected to communication endpoint 150 via a specially made connection 160 such that testing protocols and sequences may be automatically executed in a live environment, to test the call delivery framework 140 or associated components in a simulated call originating from either end of the telephony system 100, according to a preferred embodiment of the invention. The call generation device 110 may place a call over the call delivery framework 140 to the audio generation device 170 by initiating protocols to direct the communication endpoint 150 to automatically answer and connect the call to the audio generation device 170. Conversely, the audio generation device 170 may place a call to the call generation device 110 by initiating protocols to direct the communication endpoint 150 to initiate a call within the call delivery framework 140, directed to the call generation device 110. The audio generation device 170 may be connected to system 100 to facilitate an automatic Mean Opinion Score calculation. The audio generation device 170 may be connected to a local administrative network 180, which may be, for example, an in-band audio signaling network for basic functions such as device reboot or an adjunct IP network (wired Ethernet or WiFi) established for administrative purposes or onsite troubleshooting using administrative tools such as computing devices 190A/B/C/D. Typically, administrative tools 190A/B/C/D may not be accommodated on a network supporting the call delivery framework 140, hence may need a separate network 180 to access the audio generation device 170 without needing to obtain access permissions for the call delivery framework 140.

It should be appreciated that according to the embodiment, various means of connection or communication between the components of system 100 may be utilized according to the invention interchangeably or simultaneously, such as for example a direct, physical data connection (such as via a data cable or similar physical means), a software-based connection such as via an application programming interface (API) or other software communication means (such as may be suitable, for example, in arrangements where multiple system components may operate on a single hardware device such as a computing server or workstation), or any of a variety of network connections such as via the Internet or other data communications network. It should therefore be appreciated that the connections shown are exemplary in nature and represent only a selection of possible arrangements and that alternate or additional connections may be utilized according to the invention.

DETAILED DESCRIPTION OF EXEMPLARY EMBODIMENTS

Figure 2:
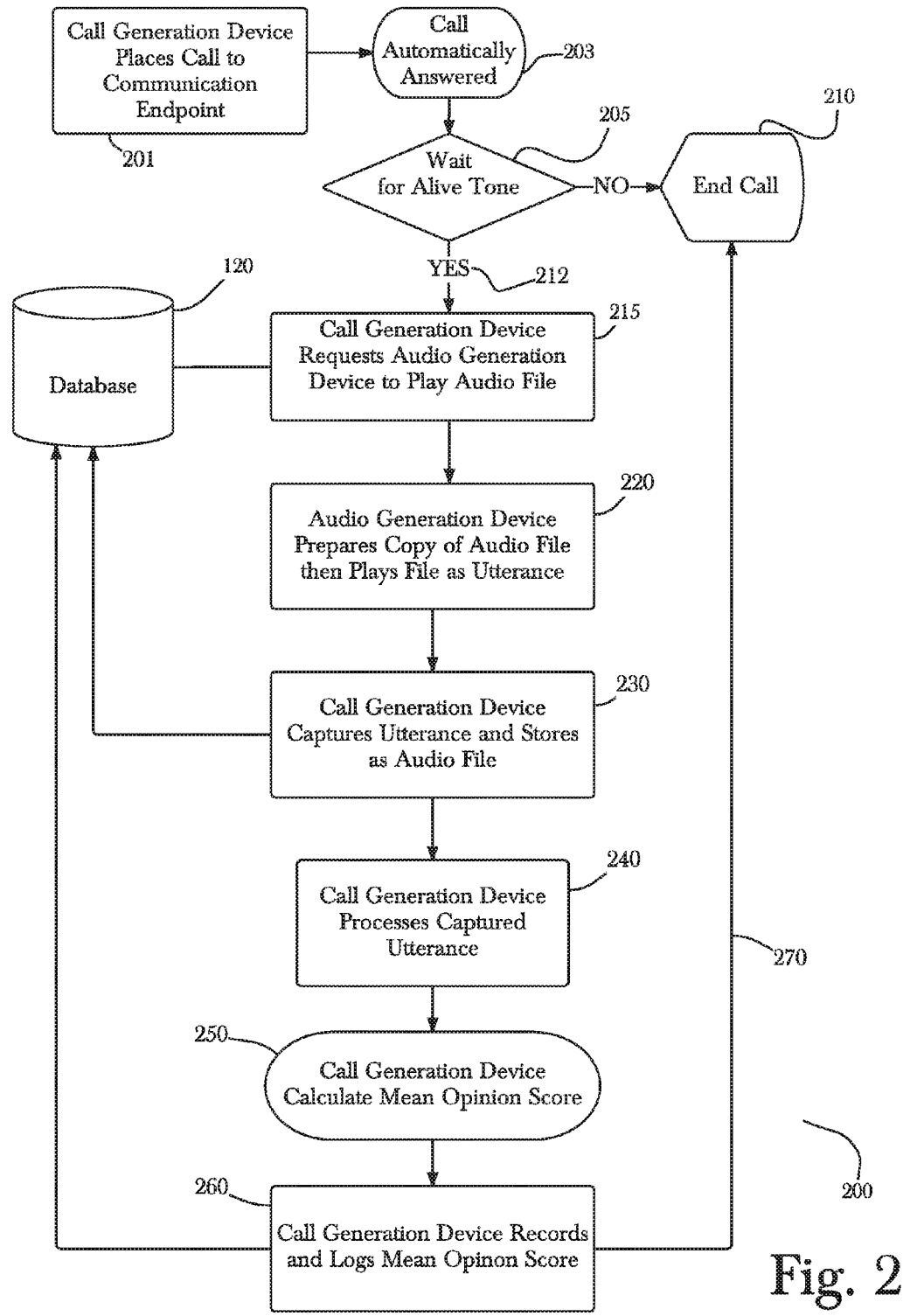
FIG. 2 is a process flow diagram of a method for determining a Mean Opinion Score for a call experience, using a system of the invention.

FIG. 2 is process flow diagram illustrating an exemplary method 200 for testing a system 100 in both directions: upstream from audio generation device 170 to call generation device 110, and downstream from call generation device 110 to audio generation device 170, in both cases, via a dedicated communication endpoint 150 connected to a call delivery framework 140. In a preferred embodiment of the invention, call generation device 110 sends known commands to audio generation device 170 by playing tones of differing frequencies to identify and execute commands, such as changing volume settings of communication endpoint 150, preparing audio generation device 170 to capture an audio file, processing an audio file to calculate a quality score, and/or initiating a soft or hard reboot of methods 200/300. Audio generation device 170 may be configured to play an alive tone 425/525 at predetermined intervals, for example, every 10 seconds, to alert call generation device 110 that audio generation device 170 is available, in an idle position, awaiting commands. In a preferred embodiment of the invention, call generation device 110, connected to system 100, places a call to communication endpoint 201, communication endpoint answers call automatically 203, waits for alive tone 205 and if no tone is received, may terminate the call 210. In such a case, the process may start again. Once an alive tone 425/525 is confirmed 212, call generation device 110 requests audio generation device to play 215 a predetermined reference audio file 469 which matches one stored in database 120. Reference audio file 469 is stored on audio generation device 170, which prepares a copy of audio file 469 then plays audio file 469 as an utterance 220. Call generation device 110 receives, captures, and stores 230 reference audio file 469 to process by comparing the transmitted audio file 469 to its matching counterpart as stored in database 120. The call generation device 110 processes the captured reference audio file 469 as an utterance 240 such that an experience score as a Mean Opinion Score (MOS) may be calculated 250 by the call generation device 110, in accordance with a prescribed full reference algorithm as a function of PESQ score mapping. Call generation device 110 records and logs a Mean Opinion Score 260, and may store it in database 120 before terminating the call 270.

Figure 3:
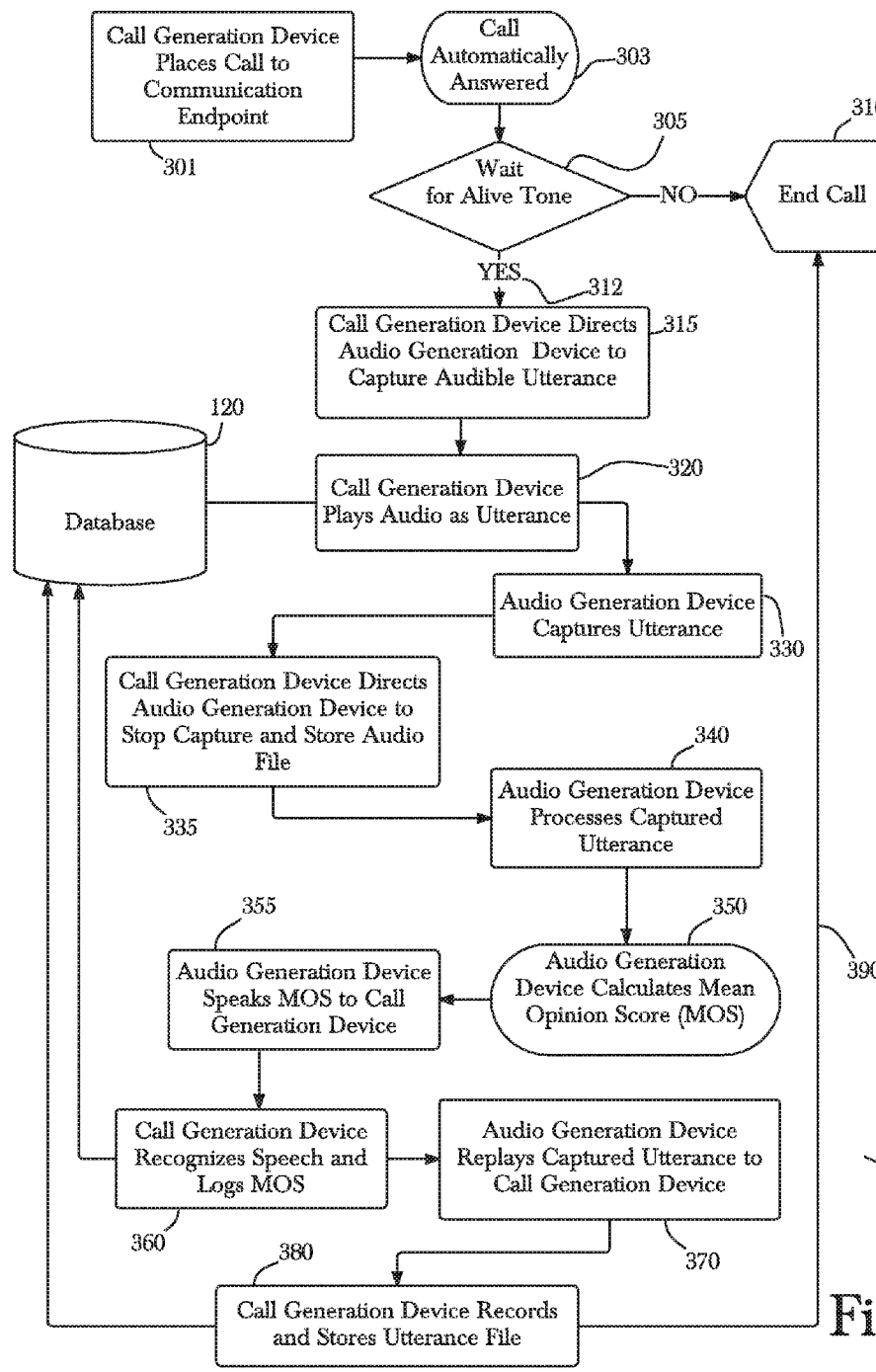
FIG. 3 is another process flow diagram of a method for determining a Mean Opinion Score for a call experience, using a system of the invention.

FIG. 3 is another process flow diagram illustrating an exemplary method 300 for testing a system 100 in both directions: upstream from audio generation device 170 to call generation device 110, and downstream from call generation device 110 to audio generation device 170, in both cases, via a dedicated communication endpoint 150 connected to a call delivery framework 140. In a preferred embodiment of the invention, call generation device 110 places a call 301 to communication endpoint 150, which automatically answers the call 303, waits for alive tone 305 and if no tone is received, may terminate the call 310. In such a case, the process may start again. Once an alive tone 425/525 is confirmed 312, call generation device 110 directs audio generation device 170 to capture an audible utterance 315. Call generation retrieves audio file from database 120, plays audio as an utterance 320, then audio generation device captures the utterance 330. Call generation device directs audio generation device to stop capturing audio and store the captured audio file 335, then to process the captured utterance 340 such that the audio generation device 170 may calculate a Mean Opinion Score (MOS) 350, in order to speak the result 355 back to the call generation device 110. The call generation device 110 recognizes the speech and logs the MOS result 360 into database 120. Audio generation device 170 replays the captured utterance 370 to the call generation device 110, and the call generation device 110 records and stores the utterance file 380 in database 120, before terminating the call 390.

Figure 4:
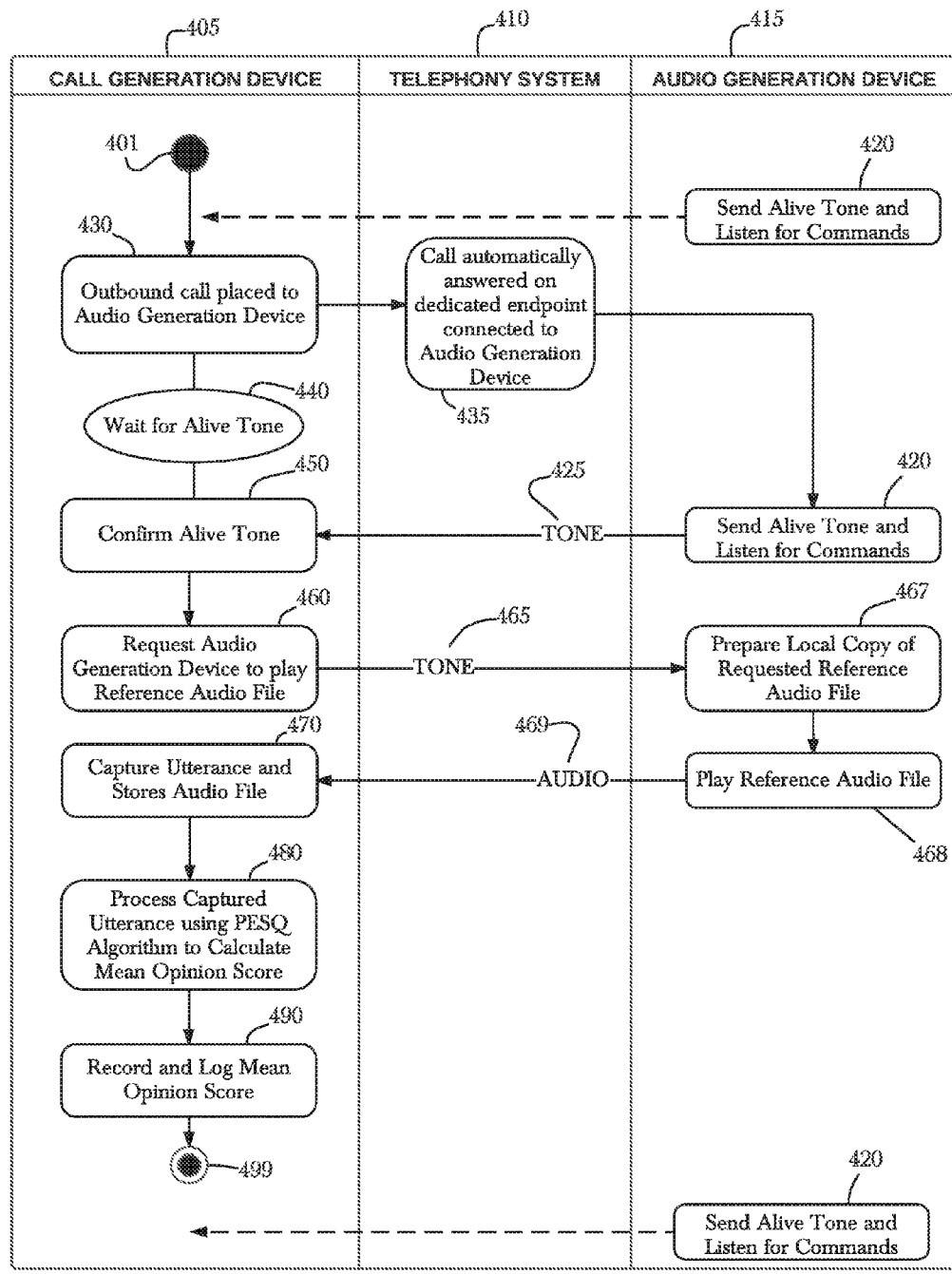
FIG. 4 is an exemplary state transition diagram illustrating a plurality of events that may occur in one or more possible stages during a downstream test sequence, according to a preferred embodiment of the invention.

FIG. 4 is exemplary state transition diagram 400 illustrating a plurality of stages of a Mean Opinion Score determination in an upstream direction, meaning a perceived quality of experience from audio generation device 415 via telephony system 410 to call generation device 405. Audio generation device 415 plays an alive tone and listens for commands 420 at predetermined intervals. Even though a call may start 401 by call generation device 405 for the purpose of measuring an inbound or upstream MOS, call generation device 405 establishes a connection with audio generation device 415 before generating an outbound call 430 from call generation device 405 to audio generation device 415, which is automatically answered on a dedicated communication endpoint 435 connected within telephony system 410. As connection is established, call generation device 405 waits 440 for alive tone 425, confirms receipt 450 of alive tone 425, before requesting audio generation device 415 to play a predetermined reference audio file 460 in order to compare original file quality and respective audible utterance to compare degradation. The request to play a predetermined audio file 460 originates as a tone 465 which signals audio generation device 415 to retrieve a local copy of the predetermined audio file 460 from its local memory, and prepare local copy of requested reference audio file 467 for playback. Audio generation device 415 audibly plays local copy of reference audio file 468 over telephony system 410 as an audible file 469. Call generation device 405 captures audio file 469 as it would have been heard, an utterance 470, processes captured utterance using PESQ algorithm to calculate Mean Opinion Score 480, then records and logs MOS result 490 before terminating the call 499.

Figure 5:
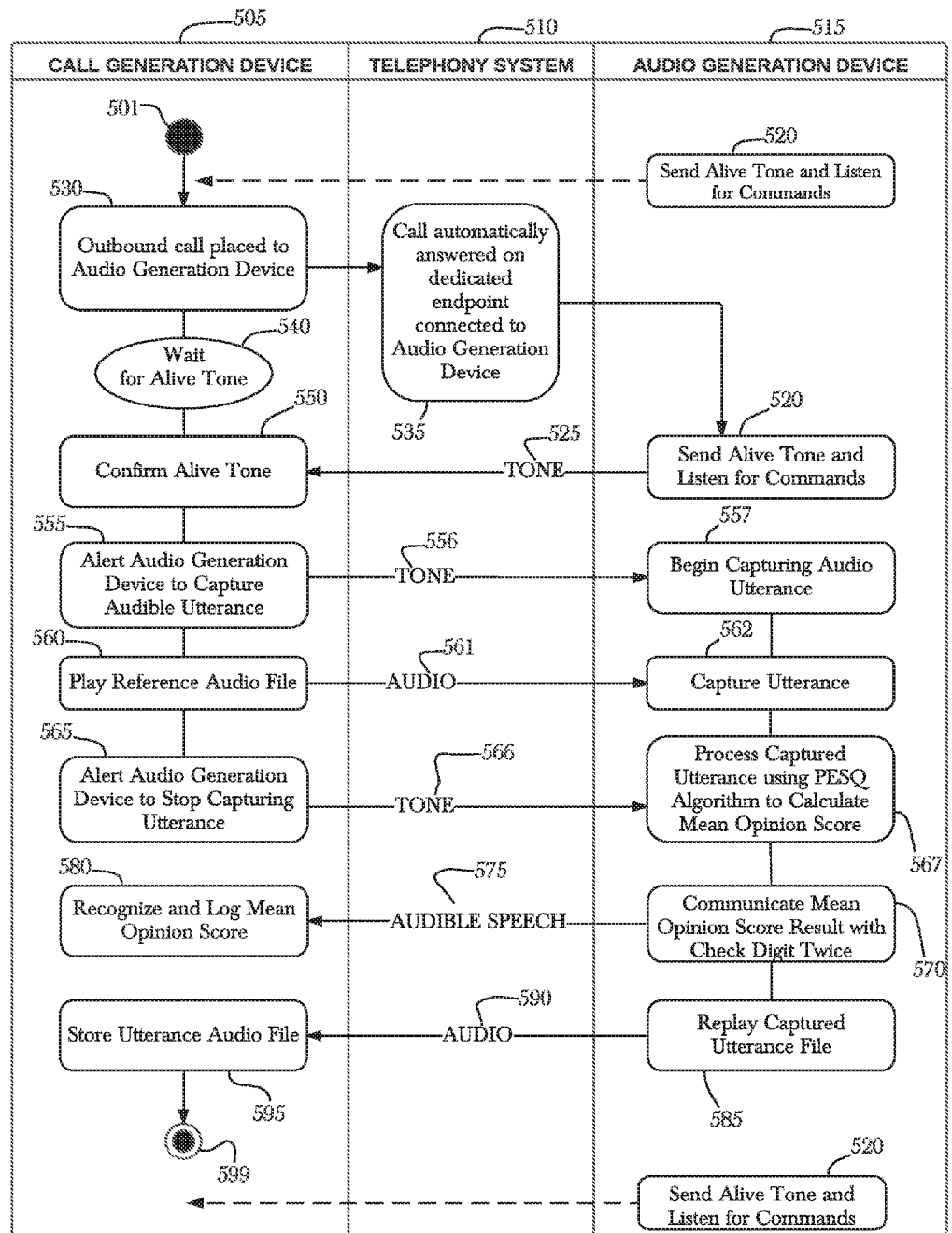
FIG. 5 is an exemplary state transition diagram illustrating a plurality of events that may occur in one or more possible stages during an upstream test sequence, according to a preferred embodiment of the invention.

FIG. 5 is another exemplary state transition diagram 500 illustrating a plurality of stages of a Mean Opinion Score determination in a downstream direction, meaning a perceived quality of experience from call generation device 505 via telephony system 510 to audio generation device 515. Audio generation device 515 plays an alive tone and listens for commands 520 at predetermined intervals. Even though a call may start 501 by call generation device 505 for the purpose of measuring an outbound or downstream MOS, call generation device 505 establishes a connection with audio generation device 515 before generating an outbound call 530 from call generation device 505 to audio generation device 515, which is automatically answered 535 on a dedicated communication endpoint connected within telephony system 510. As connection is established, call generation device 505 waits 540 for alive tone 525, confirms receipt 550, and by playing a tone 556, alerts audio generation device to capture an audible utterance 555. Upon receipt of tone 556, audio generation device 515 begins capturing utterance 557 while call generation device 505 plays reference audio file 560 as an audible speech-like sound 561. Audio generation device 515 captures audio file 561 as an utterance 562 then processes the captured utterance file 562 to calculate a Mean Opinion Score using PESQ algorithm 567. Audio generation device 515 communicates the MOS result with check digit twice 570 by playing an audible speech file 575 speaking the MOS results back to call generation device 505, where results are recognized and logged 580 by the call generation device 505. Audio generation device 515 replays captured utterance file 585 as an audio file 590 back to call generation device 505 which stores 595 utterance file 590 before terminating the call 599. Call generation device 110 may wait for audio generation device 170 to become idle before alerting it to capture an audible utterance. Call generation device 110 may wait for a plurality of time intervals, which in this particular example, may equate to multiples of ten seconds, to confirm availability. When audio generation device 170 confirms its availability, call generation device 110 plays a reference file 561 then alerts audio generation device 170 to stop capturing and store audio file 561 as an utterance file 562. Audio generation device 170 sends 265 utterance file 562 back upstream to call generation device 110, which is waiting 270 until it is received to compare files 561 to 562 to calculate a Mean Opinion Score.

Tones and remote commands executed between call generation device 110/405/505 and audio generation device 170/415/515 operate in a series of frequencies, with each frequency tone representing a specific command, as detailed in table 1100 some key functions include a secondary (lower) tone frequency in case of traversing telephony devices that attempt to filter high frequency tones (shriek rejection):

| Mark | Command Line | Frequency (Hertz) | Action |
|---|---|---|---|
| 1101 | REQUEST-GET VOLUME | 1400/550 | AGD responds with current volume level of AGD |
| 1102 | REQUEST-VOLUME-UP | 1300/600 | AGD increases persistent volume by one increment |
| 1103 | REQUEST-VOLUME-DOWN | 1350/650 | AGD decreases persistent volume by one increment |
| 1104 | PREPARE-FOR-REFERENCE | 1000/500 | AGD prepares to capture then process against a default, predetermined audio reference file (reference.wav) |
| 1105 | PREPARE-FOR-REFERENCE-A | 1050 | AGD prepares to capture then process against an alternate audio reference file (reference-alt-a.wav) |
| 1106 | PREPARE-FOR-REFERENCE-B | 1075 | AGD prepares to capture then process against an alternate audio reference file (reference-alt-b.wav) |
| 1107 | PREPARE-FOR-REFERENCE-C | 1150 | AGD prepares to capture then process against an alternate audio reference file (reference-alt-c.wav) |
| 1108 | PREPARE-FOR-REFERENCE-D | 1200 | AGD prepares to capture then process against an alternate audio reference file (reference-alt-d.wav) |
| 1109 | PREPARE-FOR-REFERENCE-E | 2045 | AGD prepares to capture then process against an alternate audio reference file (reference-alt-e.wav) |
| 1110 | END-OF-REFERENCE | 1500/800 | AGD stops capturing degraded audio, processes captured utterance, responds with MOS result, replays captured audio. |
| 1111 | PLAY-REFERENCE | 1750/750 | AGD plays default reference audio file (reference.wav) to be captured and processed for degradation by call generation device. |
| 1112 | PLAY-REFERENCE-A | 1800 | AGD plays an alternate reference audio (reference-alt-a.wav) to be captured and processed for degradation by call generation device. |
| 1113 | PLAY-REFERENCE-B | 1850 | AGD plays an alternate reference audio (reference-alt-b.wav) to be captured and processed for degradation by call generation device. |
| 1114 | PLAY-REFERENCE-C | 1900 | AGD plays an alternate reference audio (reference-alt-c.wav) to be captured and processed for degradation by call generation device. |
| 1115 | PLAY-REFERENCE-D | 1950 | AGD plays an alternate reference audio (reference-alt-d.wav) to be captured and processed for degradation by call generation device. |
| 1116 | PLAY-REFERENCE-E | 2000 | AGD plays an alternate reference audio (reference-alt-e.wav) to be captured and processed for degradation by call generation device. |
| 1117 | REQUEST-REBOOT-SOFT | 2100 | For administration purposes only, AGD will attempt to close running processes and reboot. |
| 1118 | REQUEST-REBOOT-HARD | 2150 | For administration purposes only, AGD will immediately reboot. |

Figure 6:
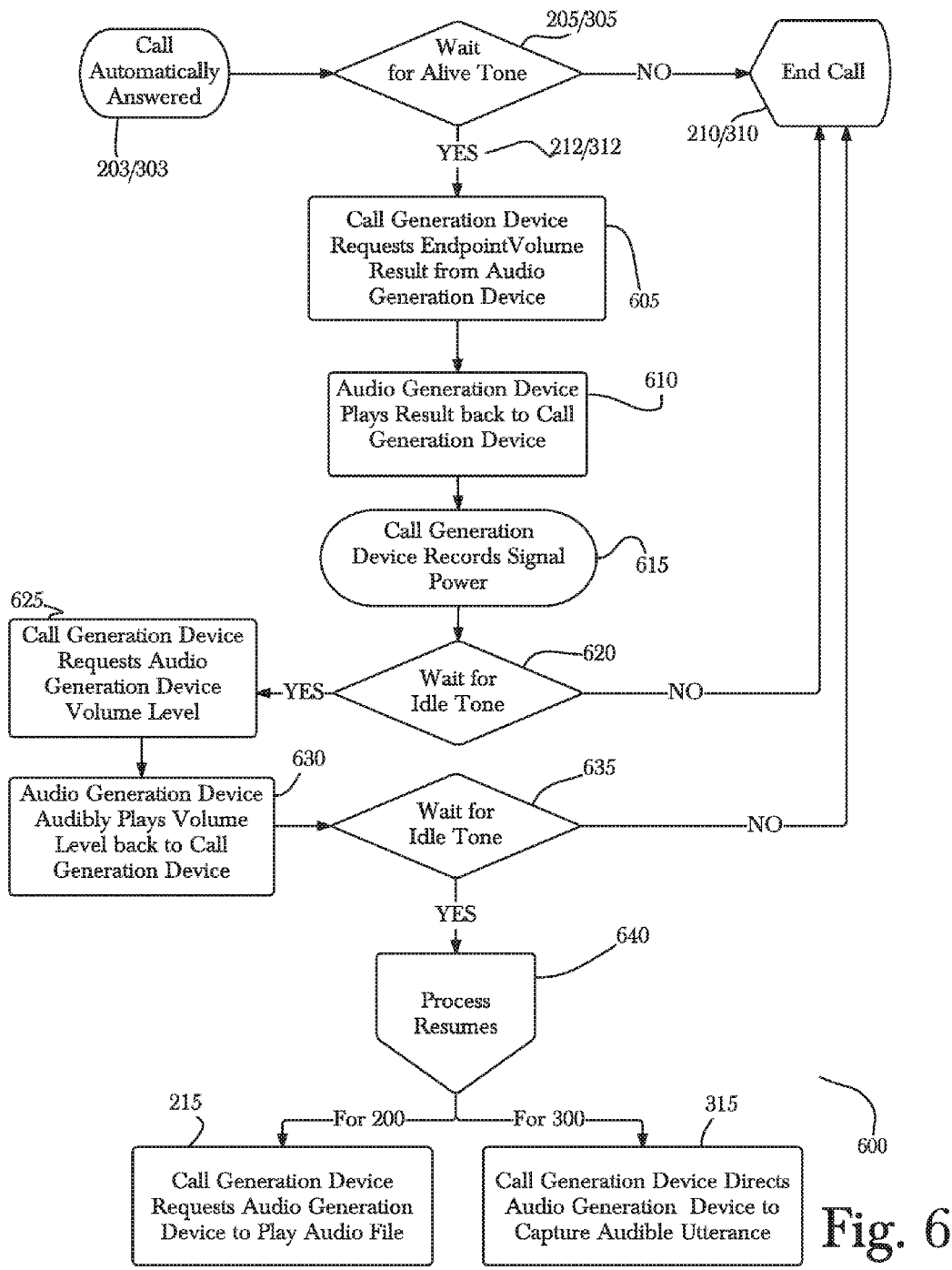
FIG. 6 is a process flow diagram of a method that may be used to set and check necessary settings and conditions prior to completing the method as depicted in FIG. 2 or the method as depicted in FIG. 3.

FIG. 6 illustrates a method 600 which may be inserted into either method 200 or method 300, interjected between method steps 212 and 215 or 312 and 315, respectively, and in this example, allows for volume settings and signal power adjustments to be made prior to proceeding to either step 215 or 315. It is crucial that volume settings on both communication endpoint 150 and the connected audio generation device 170 are aligned and balanced in order to obtain accurate MOS results. If volume settings are not balanced between communication endpoint 150 and audio generation device 170, skewed MOS results may occur. Accordingly, the inventor has conceived and reduced to practice, in a preferred embodiment of the invention, a prescribed list of settings for specific communication endpoint 150 makes and models, along with their corresponding preferred volume settings for the connected audio generation device 170. In an instance where call generation device 110 determines that volume settings may be imbalanced, method 600 may be executed. Call generation device 110 waits 205/305 to receive an alive tone 425/525 from audio generation device 170 before requesting communication endpoint volume result 605. Audio generation device 170 plays 610 result back to call generation device 110, which records signal power 615. Call generation device 110 waits for audio generation device 170 to become idle 620 before requesting audio generation device 170 volume level 625. In response, audio generation device 170 plays volume level 630 back to call generation device 110 then transitions to an idle state 635 whereby the elected process method resumes 640. Either method 200 resumes via method step 215, or method 300 resumes via method step 315.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 7:
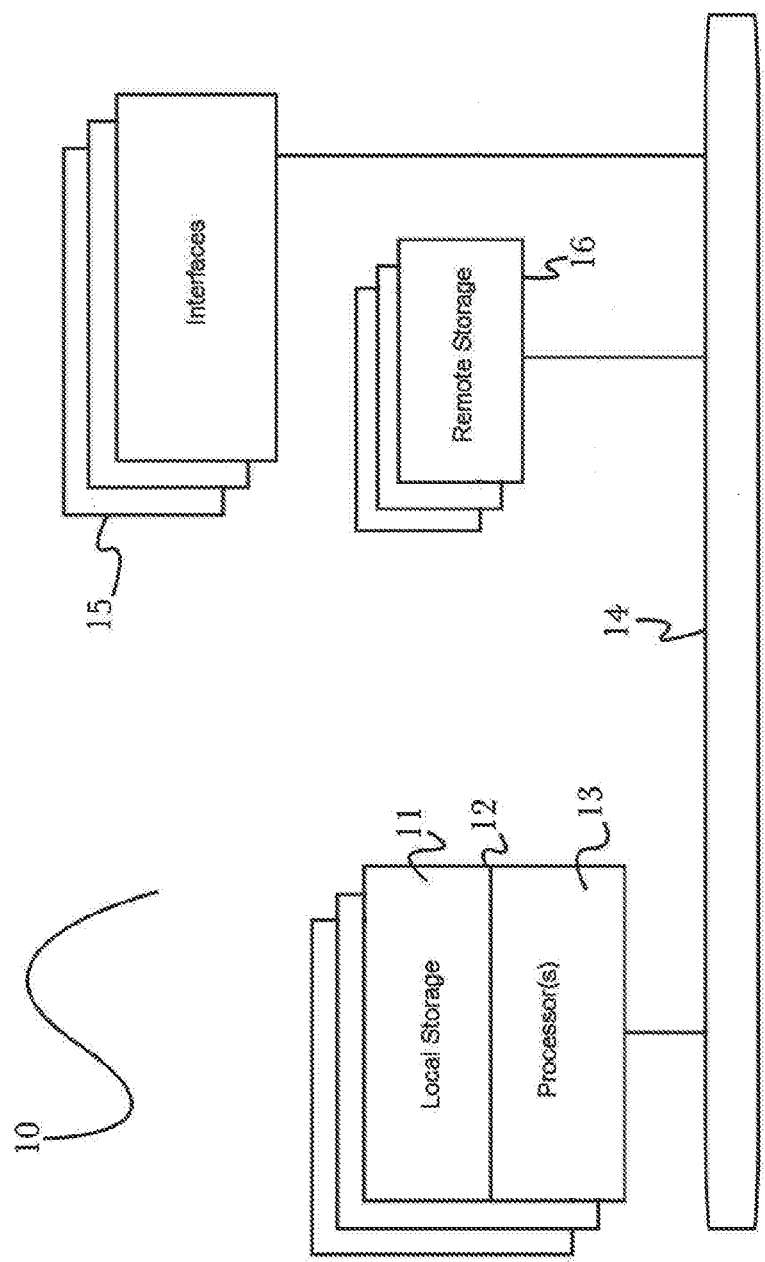
FIG. 7 is a block diagram illustrating an exemplary hardware architecture of a computing device used in an embodiment of the invention.

Referring now to FIG. 7, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 8:
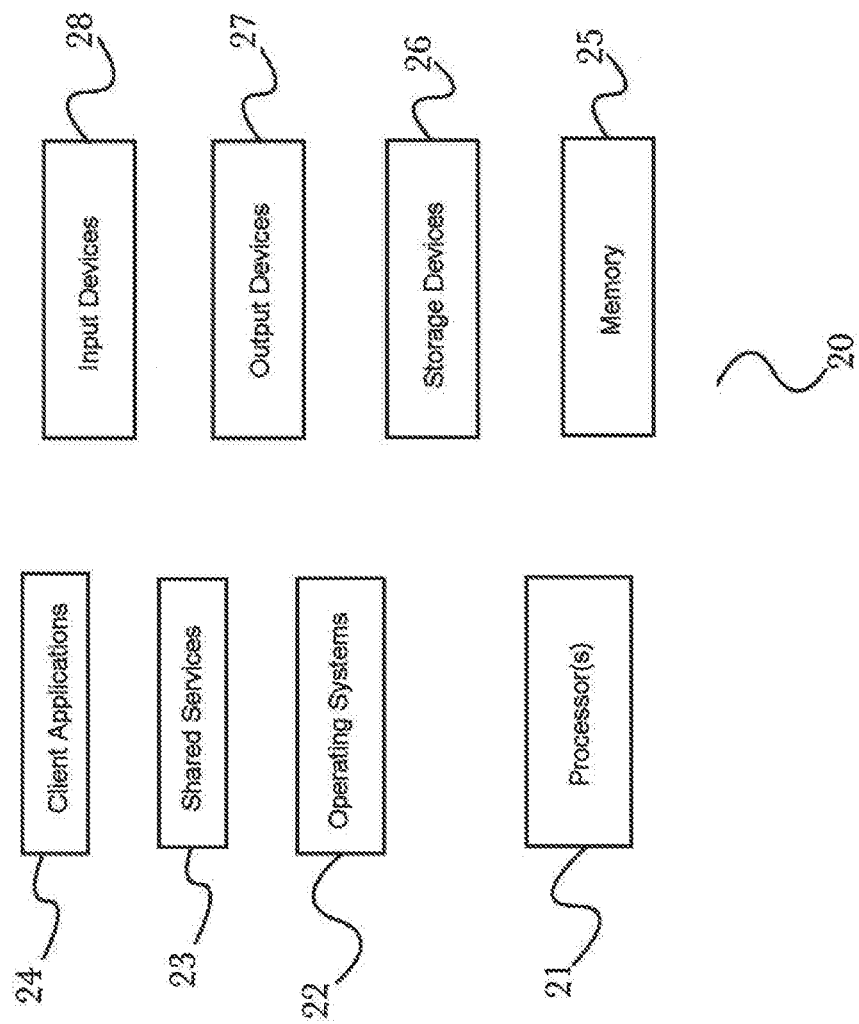
FIG. 8 is a block diagram illustrating an exemplary logical architecture for a client device, according to an embodiment of the invention.

In some embodiments, systems according to the present invention may be implemented on a standalone computing system. Referring now to FIG. 8, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 9:
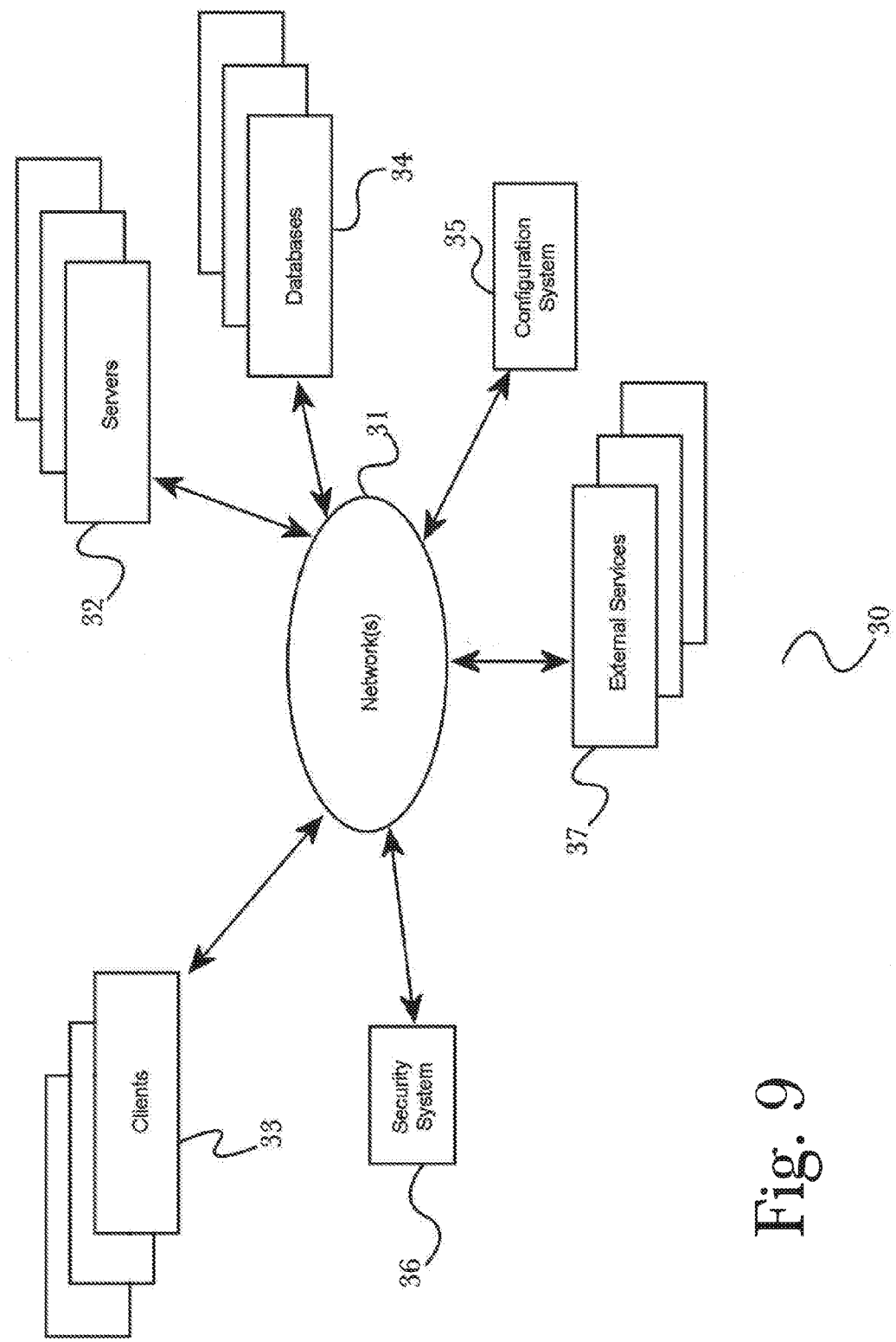
FIG. 9 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 9, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 10:
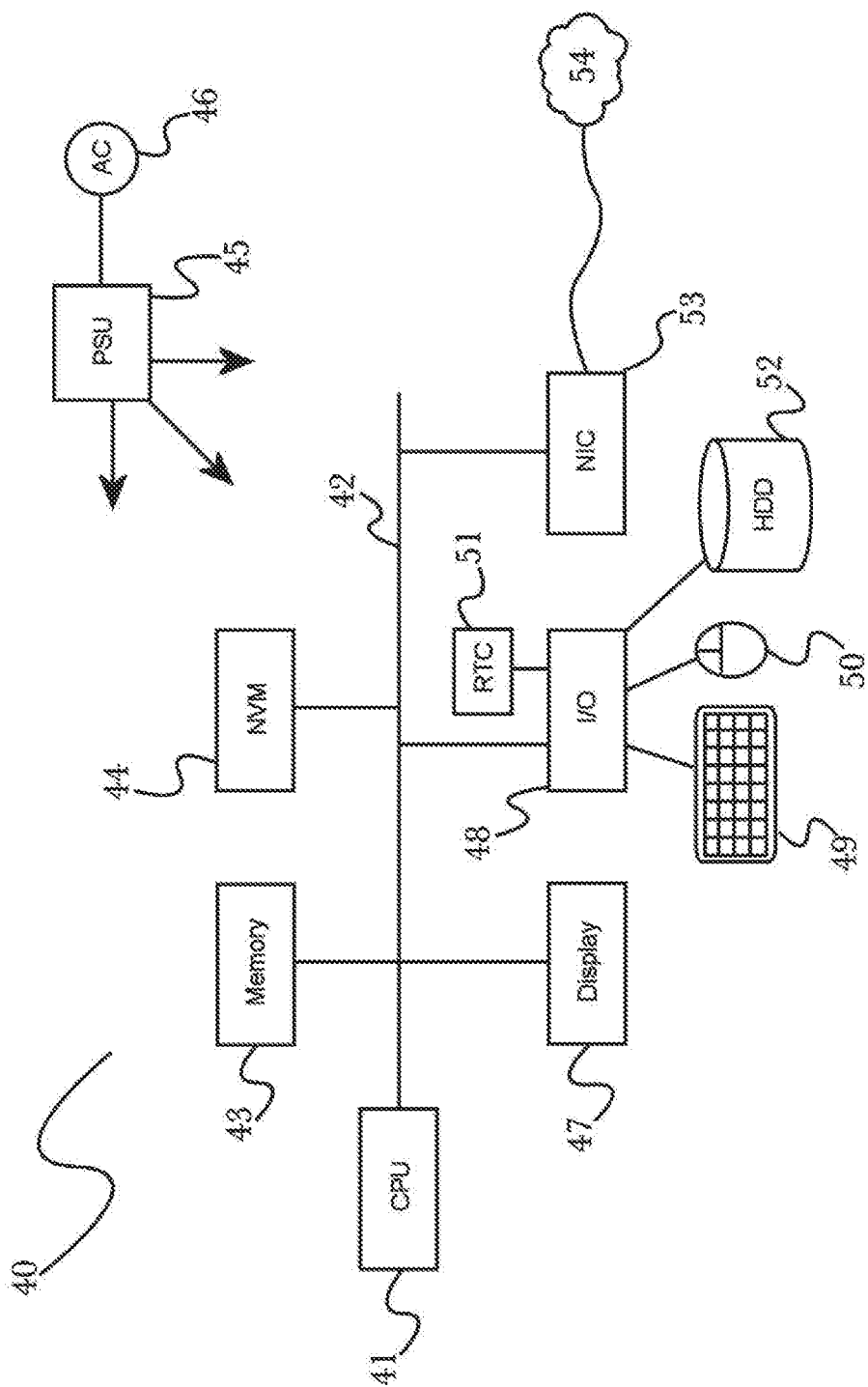
FIG. 10 is another block diagram illustrating an exemplary hardware architecture of a computing device used in various embodiments of the invention.

FIG. 10 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for bi-directional quality testing of a telephony system or network using an audio generation device, comprising:
  a computer comprising a processor, a memory, and a plurality of programming instructions stored in the memory and operable on the processor, wherein the plurality of programming instructions is configured to:
  (a) connect to a communication endpoint on one end of a call;
  (b) listen through an analog interface of the communication endpoint for known commands and reference audio originating from a prescribed call generation device;
  (c) record signals and audio presented during the call;
  (d) process signals and audio;
  (e) calculate voice quality for downstream audio;
  (f) generate an upstream reference audio to facilitate the calculation of Mean Opinion Score at the prescribed call generation device;
  (g) generate signals and audio for use during testing sequence;
  (h) compare files for quality assessment;
  (i) store files locally; and
  (j) allow prescribed remote access via in-band audio signaling or via an adjunct network.

2. A method for bi-directional quality testing of a telephony system or network operated by a call generation device by using an audio generation device connected to a communication endpoint, the method comprising the steps of:
  (a) placing a call from the call generation device to the communication endpoint within the telephony system or network;
  (b) answering the call generation device's call automatically at the dedicated communication endpoint;
  (c) pausing and waiting by the call generation device, for a confirmed alive tone to be received by the audio generation device;
  (d) sending an alive tone from the audio generation device, and the call generation device confirming receipt of the alive tone;
  (e) playing a specific tone from the call generation device to request the audio generation device to play a specific, prescribed reference audio file;
  (f) preparing a local copy of the prescribed reference audio file using the audio generation device, then playing the reference audio file audibly as an utterance;
  (g) capturing the utterance on the call generation device and storing the utterance as an audio file;
  (h) processing, using the call generation device, the captured utterance to calculate an indicia of voice quality; and
  (i) recording the indicia of voice quality by the call generation device, then terminating the call.

3. A method for bi-directional quality testing of a telephony system or network operated by a call generation device by using an audio generation device connected to a communication endpoint, the method comprising the steps of:
  (a) placing a call from the call generation device to the communication endpoint within the telephony system or network;
  (b) answering the call generation device's call automatically at the dedicated communication endpoint;

(c) pausing and waiting by the call generation device, for a confirmed alive tone to be received by the audio generation device;
(d) sending an alive tone from the audio generation device, and the call generation device confirming receipt of the alive tone;
(e) playing a specific tone from the call generation device, to direct the audio generation device to begin capturing an audible utterance;
(f) playing a prescribed reference audio file from the call generation device, to be captured as an utterance by the audio generation device;
(g) playing a specific tone from the call generation device, to direct the audio generation device to stop capturing the audible utterance and store it as an audio file;
(h) processing, using the audio generation device, the captured utterance with a Perceptual Evaluation of Speech Quality Full Reference algorithm to calculate a Mean Opinion Score;
(i) communicating the Mean Opinion Score result from the audio generation device back to the call generation device by way of audible speech;
(j) the call generation device recognizing the speech and logging the Mean Opinion Score;
(k) replaying the captured utterance file from the audio generation device back to the call generation device; and
(l) recording and logging of the utterance audio file by the call generation device, then terminating the call.

* * * * *